United States Patent [19]

Walker

[11] 3,831,093

[45] Aug. 20, 1974

[54] SIGNAL-TO-NOISE RATIO DETECTOR FOR AUTOMATIC GAIN CONTROLLED RECEIVERS

[75] Inventor: Edward Hugh Walker, Mt. Fern, N.J.

[73] Assignee: Bell Telephone Laboratories, Incorporated, Murray Hill, N.J.

[22] Filed: Feb. 28, 1973

[21] Appl. No.: 336,787

[52] U.S. Cl. .................... 325/56, 325/67, 325/304, 325/363, 325/410, 328/175

[51] Int. Cl. .................... H04b 7/02, H04b 3/46

[58] Field of Search ......... 325/31, 67, 304, 363, 56, 325/62, 400, 410, 411; 328/168, 173, 175

[56] References Cited

UNITED STATES PATENTS

| | | | |
|---|---|---|---|
| 2,803,746 | 8/1957 | Dimmer | 325/304 |
| 3,302,116 | 1/1967 | Free | 325/363 |
| 3,683,282 | 8/1972 | D'Amato et al. | 325/363 |

*Primary Examiner*—Albert J. Mayer
*Assistant Examiner*—Marc E. Bookbinder
*Attorney, Agent, or Firm*—David L. Hurewitz

[57] ABSTRACT

In an automatic gain controlled receiver for receiving alternating periods of signal and noise the transient response to the termination of signal reception is used to produce an indication of signal-to-noise ratio. The level of the gain controlled input is monitored and a charging circuit is used to delay the change of level which would otherwise occur as a step function upon termination of signal reception. The level monitored during signal reception is then compared with the peak of the level attained after termination and due to the delayed change, this difference is essentially proportional to the db signal-to-noise ratio.

The resultant signal-to-noise indication, which may be quantized, can be used as the basis for selection among remote receivers in a diversity receiver arrangement.

10 Claims, 3 Drawing Figures

SIGNAL-TO-NOISE RATIO DETECTOR FOR AUTOMATIC GAIN CONTROLLED RECEIVERS

BACKGROUND OF THE INVENTION

This invention relates to radio receivers, and more particularly, to automatic gain controlled receivers having signal-to-noise ratio detecting capability.

As is well known the quality of radio reception may be measured by determining a receiver's signal-to-noise ratio, and this ratio is conventionally derived by comparing separately measured levels indicative of signal-plus-noise and noise-only. A quality indication such as the signal-to-noise ratio is often needed for designing, testing and setting up a communication link, but for one class of communication system an indication of signal quality is required for operation.

A technique referred to as selection diversity reception utilizes a number of diversely located receivers. Each receives the same transmission, but only the one receiving via the best transmission path is utilized, and this selection, of course, requires a determination as to which receiver is receiving the best quality input.

This selection diversity technique may be found at fixed location receivers in large mobile radio telephone systems such as a coastal harbor radio system, which is designed to receive signals from ship-board transmitters at unknown locations. The determination of signal quality in each receiver has been conventionally accomplished by comparing the signal strengths of the reception at the various receivers; of course, the signal-to-noise ratio is often related to the signal strength, but an individual receiver, especially one having automatic gain control, may produce a strong output signal when it is only receiving noise. This would, of course, lead to the selection of the least, not the most, desirable of the diverse receptions.

The value of such a diversity technique is, of course, limited if the system is not able to switch to a new receiver whenever the relative signal quality changes. It is thus desirable to monitor the signal quality indication on a continuous basis. However, existing techniques for determining signal-to-noise ratio by separately measuring signal-plus-noise and comparing it with noise require complex apparatus and may require much time, making continuous reselection among receivers difficult. The use of the signal-to-noise ratio has therefore not found general application in diversity selection systems.

Accordingly, it is the object of the present invention to provide a mechanism for determining signal quality of an individual rceiver rapidly and inexpensively. It is a further object to provide for measurement of a receiver's signal-to-noise ratio. It is an additional object to provide selection diversity reception based upon signal-to-noise ratio indications derived from remotely located receivers.

SUMMARY OF THE INVENTION

In accordance with the present invention a class of receivers responsive to intermittent reception, but each having automatic gain control capability, is provided with circuitry which generates an indication of signal-to-noise ratio. As used herein, intermittent reception is that type of signal format which comprises alternate periods of signal and no-signal; each signal period containing modulated intelligence, and each alternating no-signal period being free of carrier as well as modulation. This intermittent reception occurs in systems employing push-to-talk transmission, as well as those utilizing suppressed carrier transmission.

The receiver's automatic gain control characteristic is utilized to produce the signal-to-noise indication. Operation is based upon the fact that for reception of intermittent transmission, cessation of a signal period, such as may be caused by the release of the talk button on a push-to-talk transmitter, causes the amplitude of the gain controlled IF signal at the receiver to undergo a transition from a first stable voltage level established during the reception of the modulated signal to a second stable level responsive to noise alone. The receiver gain does not change instantaneously and a charging circuit, charged during a signal period, discharges after the signal period terminates, thus delaying the change of level which would otherwise occur as a step function upon the termination so that the transient voltage swing from the first level to a peak value reached prior to the stabilization at the second level is proportional to the db signal-to-noise ratio.

The receiver includes circuitry which generates an analog indication of the transient voltage swing and this swing, which is indicative of the signal-to-noise ratio, may be digitally encoded. In diversity arrangements, the signal-to-noise indication, either in analog or digital form, may be used at a control terminal to select the receiver with the best signal-to-noise ratio.

DETAILED DESCRIPTION

Figure 1:
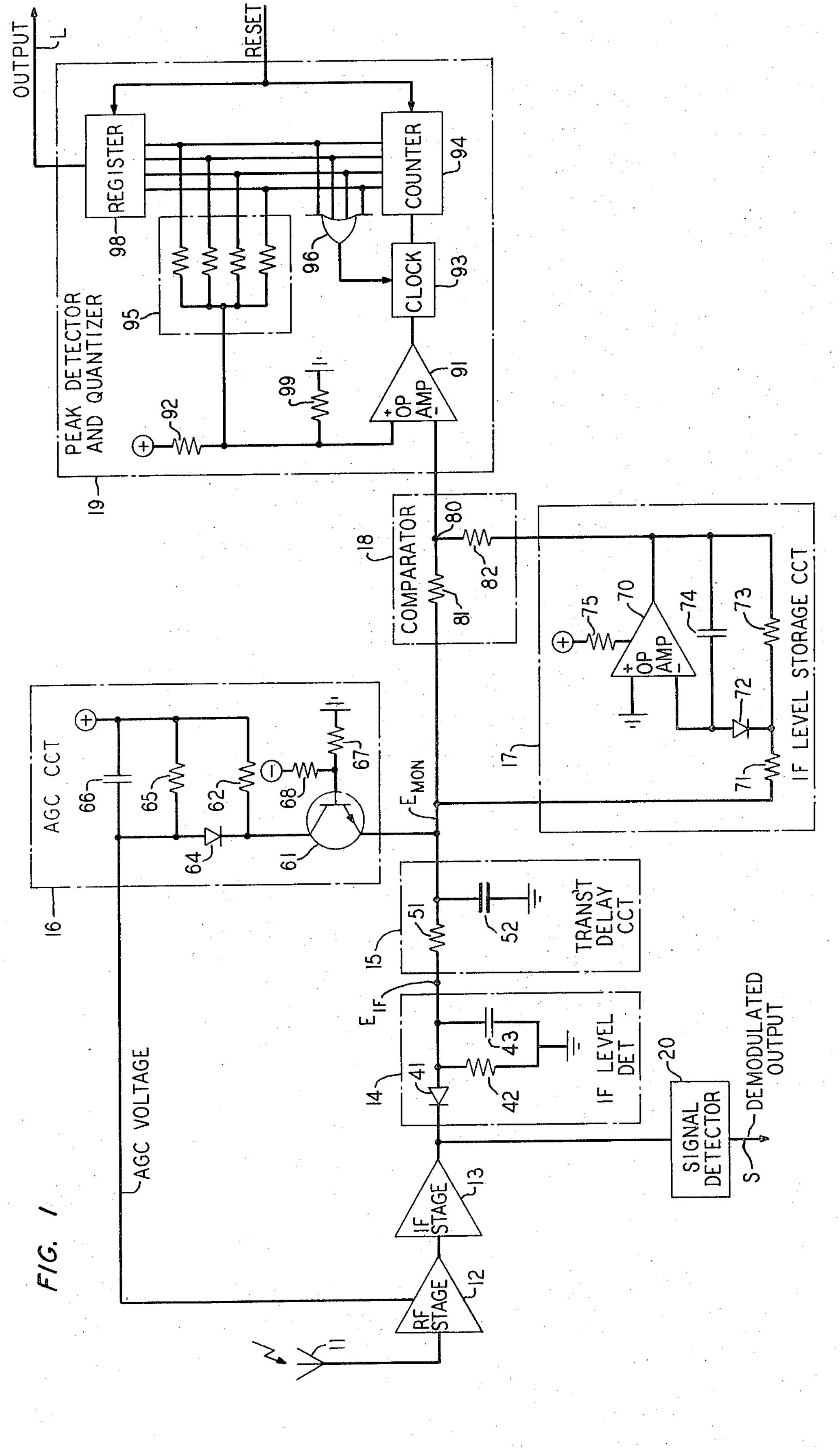
FIG. 1 is a combination block and schematic diagram of an automatic gain controlled receiver having signal-to-noise detection capability in accordance with the present invention.

FIG. 1 shows a block diagram of a gain controlled receiver and further illustrates specific circuitry of those elements which are necessary to provide a signal-to-noise indication under conditions of intermittent reception. These individual circuits are simply illustrative embodiments and other conventional circuitry is, of course, available which would perform the required functions.

The modulated intermittent RF transmission received by antenna 11 is assumed to be a double sideband amplitude modulated signal transmitted on a push-to-talk basis, but other forms of modulation as well as other formats for producing intermittent transmission may, of course, be used. The reception is amplified by appropriate amplification stages representatively designed RF stage 12 and IF stage 13. Additional stages, which are often employed, are not necessary for the operation of the invention and are therefore not shown. The output of the final IF stage is applied to signal detector 20 which demodulates the reception in a conventional manner to produce the demodulated output on lead S.

The gain of RF stage 12 is controlled by an AGC voltage from automatic gain control circuit 16. Of course, additional stages may also be gain controlled, but it is the output from the final IF stage which is used to derive an indication of the signal-to-noise ratio and detection of this ratio can be accomplished if any one stage is provided with automatic gain control.

Figure 2:
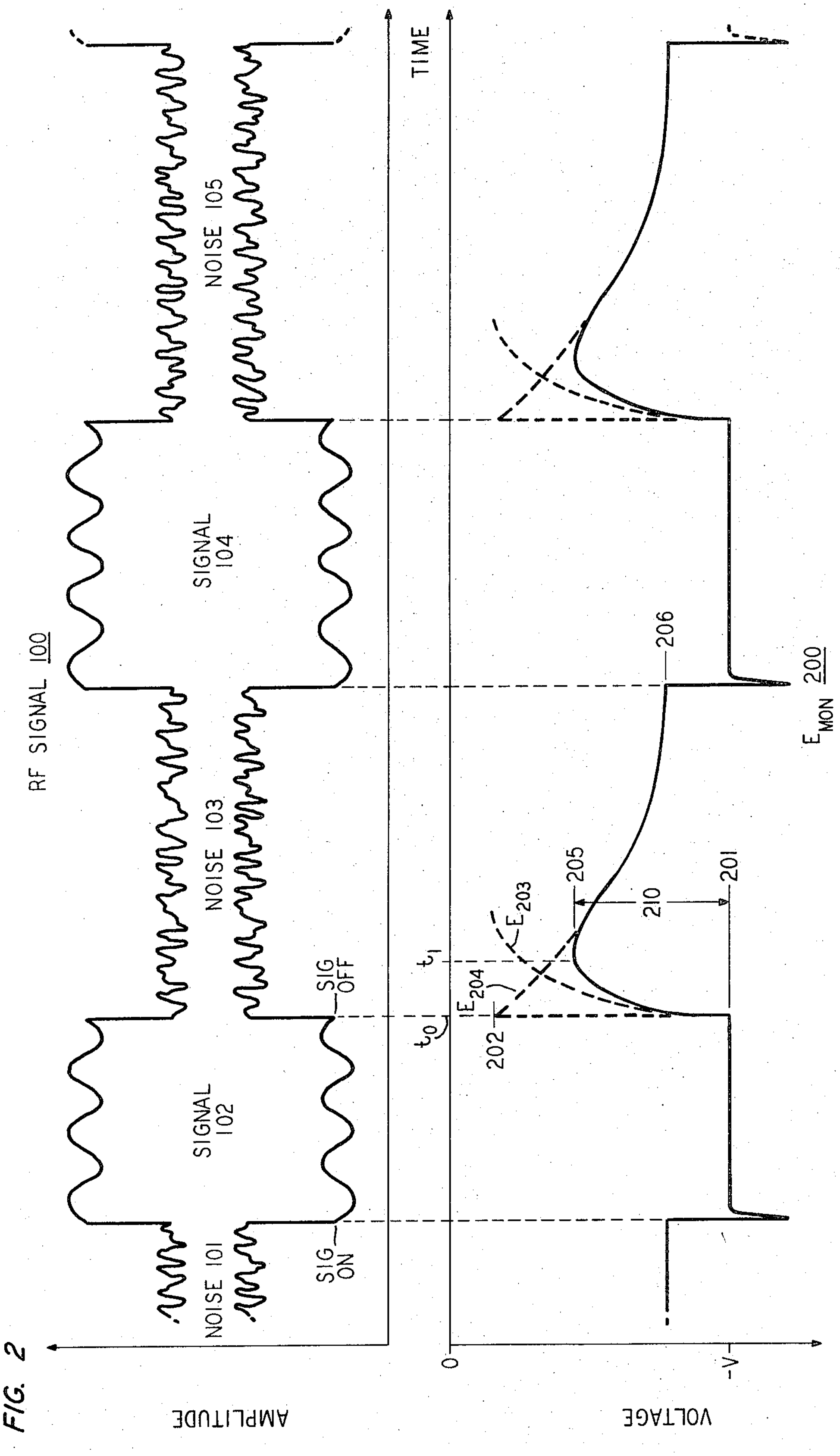
FIG. 2 shows graphical presentations of signals in the circuit of FIG. 1 helpful in explaining the operation of the invention.

An amplitude versus time plot of a modulated intermittent RF signal is shown as 100 in FIG. 2. The reception is produced by an amplitude modulated push-to-talk transmitter and hence periods of no-signal, such as 101, 103 and 105, alternate with periods of signal, such as 102 and 104; neither carrier nor modulation is present during the no-signal periods, and hence they may be designated as noise periods. Other transmission formats, such as suppressed carrier, may be used to produce intermittent reception, but whatever transmission format is employed successive periods of reception must be separated by periods receiving only noise.

The output of the final IF stage 13 is monitored by IF level detector 14, which consists of diode 41 operating with an RF filter consisting of resistor 42 and capacitor 43. This detector develops a dc voltage designated $E_{IF}$ proportional to the amplitude of the gain controlled IF output, and this level is proportional to the strength of the RF reception. While detector 14, as shown, develops an $E_{IF}$ voltage of negative polarity, this is an arbitrary choice and if positive polarity were selected, appropriate modification in the receiver circuitry would be required. $E_{IF}$ is applied to transient delay circuit 15 which is simply a charging network formed by charging resistor 51 and grounded capacitor 52.

The output voltage of transient delay circuit 15 is proportional to the strength of the RF reception after transient conditions have settled out, and this voltage, designated $E_{MON}$ since it used to monitor the level of the reception, is applied to the input of AGC circuit 16 at the emitter of grounded base transistor 61. The collector of transistor 61 develops a voltage across resistor 62 when the output exceeds the threshold bias of the transistor as determined by its inherent characteristics and the value of bias resistors 67 and 68. The collector voltage is applied to a storage network consisting of diode 64, resistor 65 and capacitor 66. The output voltage of the storage network at the common junction of capacitor 66, resistor 65 and the cathode of diode 64 is the AGC voltage which is fed back to the amplifying stage, or stages, to provide automatic gain control. The gain control loop exhibits a conventionally slow gain recovery, the long time constant for the recovery being fixed by selecting the values of resistor 65 and capacitor 66 to provide a time constant on the order of one second or more.

The output of transient delay circuit 15, which is applied to gain control circuit 16, is also used to determine the signal-to-noise ratio. This voltage is plotted as 200 in FIG. 2 against the same time axis as is the RF signal amplitude 100. During a signal period, such as 102, $E_{IF}$ charges capacitor 52 through resistor 51 and $E_{MON}$ settles to a level of −V volts (shown as 201) which is proportional to $E_{IF}$, and hence to the RF signal strength.

At $t_o$, the end of the period of signal reception, the receiver input changes from signal-plus-noise to noise-only. At the instant of this input change the receiver gain has the value set by the automatic gain control circuit during the preceding period 102 of signal reception. If the noise level during the succeeding no-signal period 103 is significantly lower than the level during the signal period, the negative $E_{IF}$ from detector 14 would become more positive and reach a point determined by the instantaneous value of the receiver gain and the noise input. If, due to a low signal-to-noise ratio, a succeeding noise level is substantially the same as its preceding signal level, $E_{IF}$ would remain essentially constant.

A positive-going change of $E_{IF}$ causes capacitor 52 to discharge with a time constant established by resistor 51 and capacitor 52 in conjunction with the input impedance of transistor 61. The element values are selected so that this time constant is very short, on the order of tens of milliseconds; thus, capacitor 52 discharges faster than the receiver gain recovers. The isolated effect of this discharge would be to produce an exponential change in $E_{MON}$ shown as $E_{203}$.

The change of $E_{IF}$ at $t_o$ also affects AGC circuit 16, since it produces an instantaneous change in $E_{MON}$ which reduces the collector output voltage of transistor 61. Because of diode 64's connection to the resistor 65 – capacitor 66 storage network, the AGC voltage does not follow the rapid change of collector voltage, but it changes at the slower gain recovery rate. Depending upon the difference between the signal level and the noise level, the bias threshold of transistor 61 may in fact be reached causing the transistor to cut OFF.

Without the effect of the offsetting discharge of capacitor 52, $E_{MON}$ would experience a positive step change at $t_o$ due exclusively to the change of level input to the receiver. This step is followed by an increasingly negative output shown as $E_{204}$ due to the receiver gain recovery during reception of noise in no-signal period 103.

The step change in $E_{IF}$ tends to discharge capacitor 52 to produce $E_{203}$, and the gain recovery tends to charge capacitor 52 and produce $E_{204}$. $E_{MON}$ results from the combined effects of the two transient components $E_{203}$ and $E_{204}$. Essentially $E_{203}$ will offset $E_{204}$ and $E_{MON}$ will increase exponentially as does $E_{203}$ until $t_1$, when its rate of increase is equalled by the rate of decrease of $E_{204}$. At $t_1$ $E_{MON}$ reaches a peak value of 205. Thereafter, it continually decreases until the receiver gain recovers and a new settled level of $E_{MON}$ is established at 206 consistent with the noise input level. Accordingly, the discharge of capacitor 52 causes the peak of the level change, monitored as $E_{MON}$, to be delayed until $t_1$ instead of occurring at $t_o$.

$E_{MON}$ is fed to IF level storage circuit 17 where resistor 71 drives transconductance operational amplifier 70 at its inverting input through diode 72. Amplifier 70 has gain control capability and may be, for example, an RCA 3080A op-amp. Resistor 73 provides a feedback path that maintains the gain of IF level storage circuit 17 at a constant value of unity, and hence the output of circuit 17 is an inverted representation of the IF level 201 established during signal period 102. Capacitor 74 stores the output voltage of the op-amp when the voltage to resistor 71 changes at the end of a signal period.

It is noted that for use with single sideband amplitude modulated (SSB-AM) transmission the output of the op-amp must be stored with a long time constant, on the order of 20 seconds. This long time constant, determined by the value of capacitor 74 and the value of resistor 82 multiplied by the gain of op-amp 70 which is fixed by external bias resistor 75, is required for SSB-AM reception since the IF level is due chiefly to modulated carrier and not carrier alone. Hence, during speech, numerous changes of the IF level occur as well as step changes during pauses in speech, and these changes in IF level will cause $E_{MON}$ transients similar to those shown in FIG. 2, but of lesser magnitude, for each change in speech level. The use of a long time constant allows the ultimate level stored by circuit 17 to be representative of the IF level during a period of maximum signal strength rather than following the low magnitude transients which would produce inaccurate indications of signal-to-noise.

The inverted representation of the IF level stored in circuit 17 appears across resistor 82 since resistor 82 provides a path for the current that follows the voltage of the IF level storage circuit. Resistor 81 provides a path for the current that follows the $E_{MON}$ voltage. Together, resistors 81 and 82 form comparator 18 with junction 80 as its comparison point. During a steady RF input due to signal reception, $E_{MON}$ will assume a magnitude with negative polarity and the output of IF level storage circuit 17 will assume the same magnitude with a positive polarity so that the comparator output at junction 80 will be zero. At the end of a signal period, the $E_{MON}$ voltage starts to increase due to absence of signal input. The output of IF level storage circuit 17 will retain the value it acquired during the signal reception because of its long discharge time constant. Therefore, the comparison voltage at junction 80 will no longer be zero but will assume a positive value that follows the instantaneous difference between the previous value of $E_{MON}$ stored during signal reception and the instantaneous value of $E_{MON}$; that is, the comparison voltage experiences an increasing portion, followed by a portion peaking at 205 and culminating in a decreasing portion along the gain recovery curve established by $E_{204}$.

This instantaneous difference voltage at point 80 is applied to a low impedance input of a peak detector such as 19, which determines the peak difference. The peak difference is shown illustratively as the transient voltage swing 210. This swing is representative of the signal-to-noise ratio in the receiver, and may be, as described below, essentially linearly related to the ratio in db.

Peak detector 19 is shown specifically as a detector and quantizer, and while it appears preferable to quantize the signal-to-noise ratio indication, this is not necessary for operation of the invention. However, as embodied by the specific circuitry shown, the voltage from point 80 is applied to the inverting input of a comparator op-amp 91 which may be an RCA 3080A amplifier or any other conventional differential op-amp. A low impedance resistor 99 is fed a sum of currents due to threshold bias resistor 92 and a high impedance resistive summing network 95. The resultant voltage developed across resistor 99 is applied to the noninverting input of amplifier 91. When the comparison of the voltage at junction 80 exceeds this variable reference voltage, which is initially due exclusively to the threshold bias, op-amp 91 produces a negative output to start clock 93 which is a free-running multivibrator. When running, clock 93 steps binary counter 94 and at each counter step resistive summing network 95 causes the current into resistor 92, and hence the reference voltage to op-amp 91, to be increased.

The stepping continues as the voltage at junction 80 follows $E_{MON}$ and the reference voltage keeps increasing with each step. When $E_{MON}$ reaches its peak, this stepping ceases and does not resume past the peak because the polarity of the change is reversed.

The stepping action will also stop when a maximum step count has been reached, that is, when all elements of counter 94 are ON. This can be accomplished by AND gate 96 which causes clock 93 to stop when the counter's maximum count has been reached.

The output of counter 94, which is a quantized indication of the peak difference voltage, is also fed to register 98 and the register may be read out when desired. This readout will indicate the signal-to-noise ratio as determined after the termination of a preceding signal period. The signal-to-noise indication at junction 80 will be redetermined at each such termination and does not depend upon the durations of the signal or no-signal periods, provided that the noise period is at least as long as the few milliseconds from $t_o$ to $t_1$, but the counter and register must be reset prior to the termination of each signal period in order to produce an indication of a new ratio. This may be accomplished in response to the increase in IF level at the beginning of a signal reception period, such as may be sensed by a CODAN (carrier-operated device, antinoise).

It is noted that the threshold bias applied to the comparator op-amp 91 is determined by resistor 92, and this effectively establishes a signal-to-noise ratio which the transient voltage change must exceed before quantization begins. This is used to discriminate against signal transmissions which are received with less than usable signal-to-noise ratios.

In order to more clearly understand the operation of the invention, the following discussion of the transient characteristics of $E_{MON}$ is offered. At $t_o$ the IF detector level $E_{IF}$ undergoes a step change and one transient component of $E_{MON}$ is due to the discharge from transient delay circuit 15 in response to this step. This transient, designated $E_{203}$, rises exponentially with the short discharge time constant determined by the values of resistor 51, capacitor 52 and input impedance of transistor 61. The second transient component is the result of the gain recovery characteristic of the automatic gain control loop. At $t_o$ this component rises instantaneously to a level 202, which is determined by the noise input and the gain established during the signal period, and then decreases exponentially with the long gain recovery time constant determined by the values of resistor 65 and capacitor 66. This latter transient is designated $E_{204}$.

A combination of the two transients is $E_{MON}$; $E_{MON}$ is the gain recovery transient $E_{204}$ offset from level 202 by the discharge transient $E_{203}$. It results from the combined effect of discharging capacitor 52 due to the step function and charging capacitor 52 due to the gain recovery. Thus $E_{204}$ is reduced by the effect of $E_{203}$ to produce $E_{MON}$.

The peak of $E_{MON}$ occurs at $t_1$ when the rate of increase slope of $E_{203}$ equals in magnitude the rate of decrease slope of $E_{204}$. Stated alternatively, the point $t_1$ is that point at which the slopes of $E_{203}$ and $E_{204}$ are equal in magnitude but opposite in sign. As indicated above, the circuit values are chosen so that the gain recovery time constant is much larger than the discharge time constant; for example, it should be roughly between 20 and 50 times larger, the short discharge time constant being on the order of tens of milliseconds and the long recovery time constant being on the order of seconds.

The interval from the start of the transient period at $t_0$ to the peak at $t_1$ is larger for the larger signal-to-noise ratios. Because of the inequality of the time constants of $E_{203}$ and $E_{204}$, the slopes of $E_{203}$ and $E_{204}$ are equal in magnitude and opposite in sign only at a time, $t_1$, when $E_{203}$ has decayed several time constants and $E_{204}$ has decayed a fraction of a time constant. For a given input noise level, the slope of $E_{204}$ remains substantially constant for different values of the signal-to-noise ratio, but the slope of $E_{203}$ is proportional to the magnitude of the signal-to-noise ratio since the magnitude of the voltage level 201 (which is proportional to the previously received signal strength) multiplies the exponential of the transient $E_{203}$ during the decay of $E_{203}$ from voltage level 201 toward voltage level 202. For higher input signal levels (higher signal-to-noise ratios) the $E_{203}$ transient has an initially steeper slope and therefore a longer time is required for its slope to equal the slope of $E_{204}$. For signal-to-noise ratios higher than that indicated by 210 in FIG. 2 transient component $E_{203}$ due to the transient delay circuit increases at a faster rate than the decrease of transient $E_{204}$ due to the AGC recovery. Therefore, the point $t_1$ at which the slopes of $E_{203}$ and $E_{204}$ are equal in magnitude but opposite in sign will occur later in time than shown in FIG. 2. Thus, a higher signal-to-noise ratio expands the interval between $t_0$ and $t_1$, and allows more gain recovery prior to peaking. Accordingly, the voltage swing 210 for a higher signal-to-noise ratio is greater than for a lower signal-to-noise ratio but the difference is not proportional to the absolute increase in signal-to-noise ratios. Rather, it differs by a lesser amount since the peak swing is compressed in magnitude by virtue of the effect of the increased amount of gain recovery. For circuit values chosen so that the discharge time constant and the gain recovery time constant are properly related, a mathematical analysis of the transients indicates that a substantially linear relationship between the db signal-to-noise ratio and the voltage swing 210 exists for ratios up to approximately 25 db.

It can be seen that the effect of the transient delay circuit is to delay the change in level of $E_{MON}$ from time $t_0$ and the combined effect of the transient delay circuit and the automatic gain control loop is to delay the peak of the level change so as to yield a substantially linear relationship between this peak value and the db signal-to-noise ratio.

Figure 3:
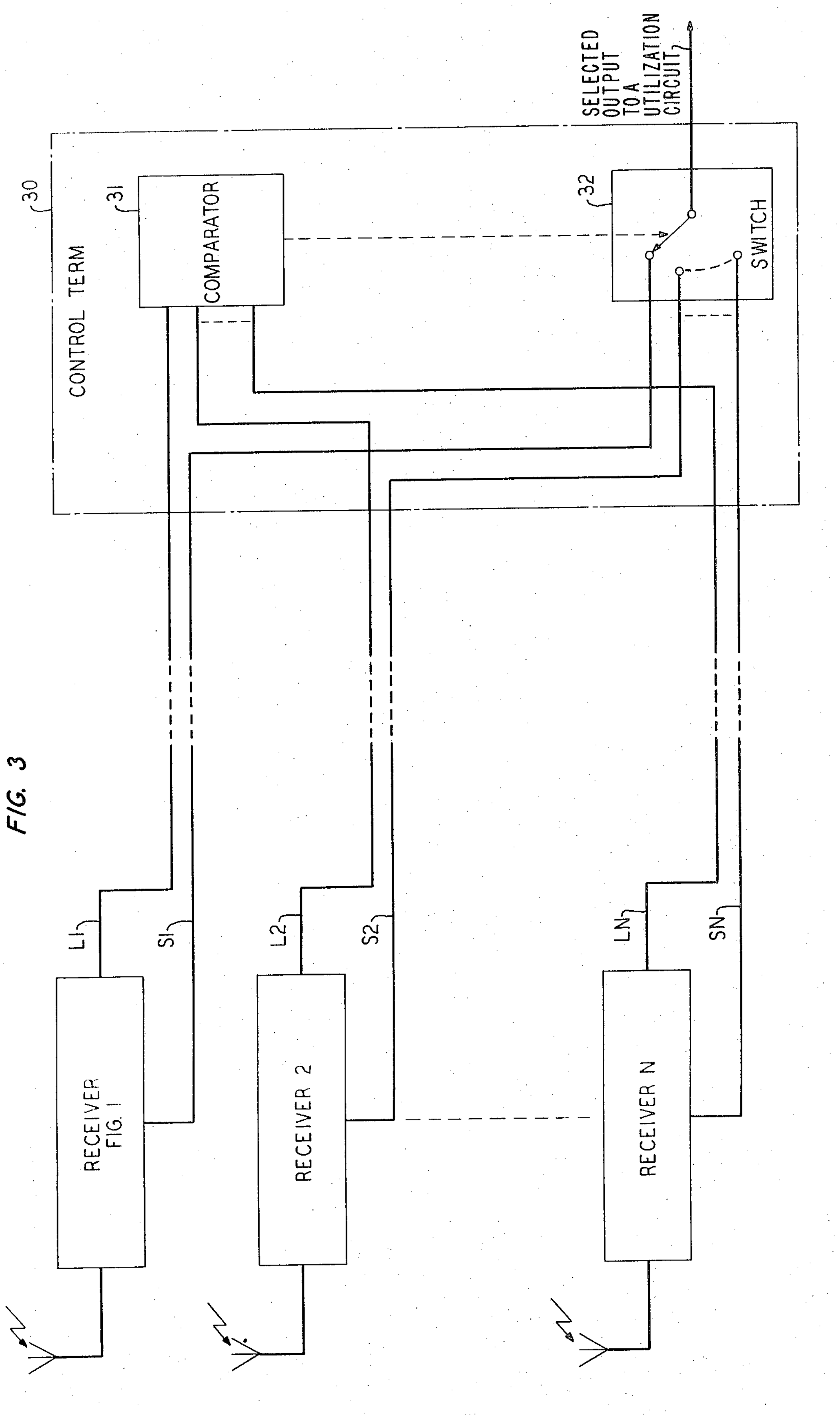
FIG. 3 is a block diagram of a selection diversity system utilizing signal-to-noise detecting receivers of FIG. 1.

The signal-to-noise indication determined by the receiver of FIG. 1 may be used for measurement purposes in numerous systems. However, it is particularly well-suited to selection diversity receiver systems such as the one illustrated in FIG. 3. N diversely located receivers receive the same modulated intermittent reception and due to their space diversity one is likely to receive a better signal than the others. If the single best reception, that is, the one having the best signal-to-noise ratio, is desired, the quantized signal-to-noise ratio output provided in accordance with the circuity of FIG. 1 and generated on leads L1, L2 . . . LN can be used at control terminal 30 to make this selection. Terminal 30, which may be remote from the individual receivers 1 through N, includes demodulated output from that receiver arriving via leads S1, S2 . . . SN to produce the single selected audio output. Comparator 31 may be any well known digital bit decoder which selects among the quantized inputs on leads L1, L2...LN. Comparator 31 controls switch 32 in standard mechanical or electrical fashion causing the switch to connect the output from the receiver having the best signal-to-noise ratio to a utilization circuit (not shown). It is evident that an analog version of the signal-to-noise indication could be utilized as well in such a selection diversity system.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. In a radio receiver responsive to an input of intermittent reception having periods of signal separated by periods of no-signal, circuitry comprising:

means for amplifying the received input, means for detecting the voltage level of the amplified received input, discharge circuit means for delaying the change of the detected voltage level to form a modified detected level for a transient period following termination of a signal period, an automatic gain control circuit responsive to the delayed detected output to adjust the amplification of the received input in accordance with the detected voltage level, means for storing the voltage level detected during a signal period, said means for storing being connected to the discharge circuit means, comparator means for forming a difference voltage by comparing during the succeeding period of no-signal the stored level with the modified detected level, and means for monitoring the difference voltage and determining the peak difference voltage following each of said terminations, whereby the peak difference voltage is indicative of the signal-to-noise ratio of the receiver.

2. Circuitry as claimed in claim 1 wherein said automatic gain control circuit has a fixed gain recovery time constant for establishing a new level of amplification in response to a change of the detected voltage level at the termination of a signal period, and said discharge circuit means has a discharge time constant, said discharge time constant being substantially shorter than the gain recovery time constant.

3. Circuitry as claimed in claim 1 wherein said automatic gain control circuit has a fixed gain recovery time constant for establishing a new level of amplification in response to a change of the detected voltage level at the termination of a signal period, said discharge circuit means is an RC circuit, the capacitor of said RC circuit being charged to a voltage level during a signal period by the input, discharged during a no-signal period at a rate determined by the discharge time constant of the RC circuit and simultaneously charged during a no-signal period at a rate determined by the gain recovery time constant, the discharge time constant being substantially shorter than the gain recovery time constant, the net effect being to first discharge and then recharge the capacitor during the no-signal period.

4. Circuitry as claimed in claim 1 wherein said means for monitoring the difference voltage and determining the peak difference voltage includes a comparator, a clock started by the comparator output, a counter stepped by the output of the clock, and feedback sensing network means for monitoring the state of the counter and developing a voltage representative of the counter state, the representative voltage and said difference voltage being applied to said comparator and said comparator producing an output when the difference between the representative voltage and said difference voltage exceeds a selected threshold.

5. A selection diversity receiver system having a single output terminal comprising, a plurality of radio receivers, each of said receivers having circuitry as claimed in claim 1, means for comparing the peak difference voltage produced by each of said receivers, and switching means responsive to the comparing means for exclusively applying to the output terminal the input reception of the receiver having the highest peak difference voltage.

6. Circuitry responsive to an input of intermittent reception having periods of signal separated by periods of no-signal comprising:

means for amplifying the received input, detecting means for detecting the voltage level of the amplified received input, delay means for effecting a change in the detected voltage level in a transition period beginning upon termination of a signal period to create a first transient component of the voltage level, which first component changes exponentially with time in one sense, means for effecting a change in the detected voltage level in the transition period to create a second transient component of the voltage level in a sense opposite to the first component, which second component changes exponentially with time independently of the first component, the voltage level in the transient period being a combination of the first and second transient components, and the voltage level in the transient period having a peak value when the magnitude of the positive rate of change of one of the transient components equals the magnitude of the negative rate of change of the other of the transient components, the occurrence of the peak value varying in time in accordance with the signal-to-noise ratio of the reception, and means for producing an output representative of the difference between the peak voltage during a transient period and the detected voltage level established during a preceding signal period.

7. Circuitry as claimed in claim 6 wherein said means for effecting a change in the detected voltage level to create the first transient component is an AGC circuit arranged to monitor the detected voltage level and control the amplification of the received input, said circuit having a gain recovery time constant which is the time constant of the first transient component.

8. Circuitry as claimed in claim 7 wherein said means for effecting a change in the detected voltage level to create the second transient component is an RC circuit, the capacitor of said RC circuit being charged during a signal period and discharged during the succeeding transition period with a discharge time constant substantially shorter than the gain recovery time constant.

9. Circuitry as claimed in claim 6 wherein said means for effecting a change in the detected voltage level to create the first transient component is an AGC circuit arranged to monitor the detected voltage level and control amplification of the received input, and said means for effecting a change in the detected voltage level to create the second transient component is an RC circuit, the capacitor of said RC circuit being charged during a signal period and discharged during the transition period, said first transient component having a time constant equal to the gain recovery time constant of the AGC circuit and the second transient component having the time constant of the RC circuit which is substantially shorter than the time constant of the gain recovery time constant, so that the peak voltage occurs at increasingly later times for increasing signal-to-noise ratios, whereby gain recovery prior to the peak value increases with increasing signal-to-noise ratios.

10. In a radio receiver circuitry responsive to an input of intermittent reception having periods of signal separated by periods of no-signal comprising:

means for amplifying the received input by a controlled gain, means for detecting the voltage level of the amplified received input, a transient delay circuit including a capacitor which is charged by the detected voltage level during a signal period and discharges at the termination of the signal period, an AGC circuit for adjusting the gain of the amplification means in accordance with the output of the transient delay circuit, storage means monitoring the output of the transient delay circuit for storing the detected level during a signal period, comparator means for comparing the output of the transient delay circuit with the stored level to form a difference voltage, and means for detecting the peak difference voltage following each signal period to produce an output indicative of the signal-to-noise ratio of the receiver.

* * * * *